US008893844B2

(12) United States Patent
Yang

(10) Patent No.: US 8,893,844 B2
(45) Date of Patent: Nov. 25, 2014

(54) DIFFERENTIAL DRIVE SYSTEM HAVING INDIVIDUAL CLUTCH CONTROL AND MUTUAL FLEXIBILITY TRANSMISSION

(76) Inventor: Tai-Her Yang, Dzan-Hwa (TW)

( * ) Notice: Subject to any disclaimer, the term of this patent is extended or adjusted under 35 U.S.C. 154(b) by 8 days.

(21) Appl. No.: 13/444,086

(22) Filed: Apr. 11, 2012

(65) Prior Publication Data

US 2013/0231832 A1 Sep. 5, 2013

Related U.S. Application Data

(63) Continuation-in-part of application No. 13/410,385, filed on Mar. 2, 2012.

(51) Int. Cl.
*B60K 17/16* (2006.01)
*B60K 17/02* (2006.01)

(52) U.S. Cl.
CPC ............... *B60K 17/165* (2013.01); *B60K 17/02* (2013.01)
USPC .......................................... 180/245; 180/246

(58) Field of Classification Search
CPC ....................... B60K 17/165; B60W 2720/406
USPC ........................................ 701/59, 51; 477/35
See application file for complete search history.

(56) References Cited

U.S. PATENT DOCUMENTS

| | | | | |
|---|---|---|---|---|
| 7,007,763 | B2 * | 3/2006 | Ginther et al. | 180/6.2 |
| 8,573,348 | B2 * | 11/2013 | Cantemir et al. | 180/246 |
| 2006/0037792 | A1 * | 2/2006 | Boss et al. | 180/65.6 |
| 2007/0144283 | A1 * | 6/2007 | Hasegawa et al. | 74/325 |

* cited by examiner

*Primary Examiner* — John R Olszewski
*Assistant Examiner* — Todd Melton
(74) *Attorney, Agent, or Firm* — Bacon & Thomas, PLLC

(57) ABSTRACT

The present invention utilizes the rotary kinetic power to drive the first transmission device (T101), and is individually installed with the output end transmission devices to the output end of the first transmission device (T101), so as to drive the loading wheel sets installed at the two sides of the common load body (L100), as well as installed with individually controlled output end clutch devices for controlling the driven wheel sets and the wheel shafts to perform engaging transmission or terminating transmission, and between the wheel shafts of the loading wheel sets at two lateral sides of the common load body (L100), a flexibility transmission device is installed, thereby through the flexibility transmission device performing the flexibility transmission with differential rotational speed from the engaging transmission side to the terminating transmission side.

17 Claims, 4 Drawing Sheets

DIFFERENTIAL DRIVE SYSTEM HAVING INDIVIDUAL CLUTCH CONTROL AND MUTUAL FLEXIBILITY TRANSMISSION

CROSS-REFERENCE TO RELATED APPLICATION

This application is a Continuation-In-Part of my patent application Ser. No. 13/410,385, filed on Mar. 2, 2012.

BACKGROUND OF THE INVENTION (a) Field of the Invention

According to the present invention, the differential drive system having individual clutch control and mutual flexibility transmission utilizes the rotary kinetic power of a rotary kinetic power source to directly drive a first transmission device (T101), or through an input end clutch device (CL101) to drive the first transmission device (T101), and between the output end of the first transmission device (T101) and two or more than two loading wheel sets driven thereby, an output end transmission device is individually installed for driving the loading wheel sets arranged at two sides of a common load body (L100), so as to drive the combined common load body, and an individually-controlled output end clutch device is installed for driving the output end transmission device and the driven wheel set and the wheel shaft to perform engaging transmission or terminating transmission, and between the wheel shafts of the loading wheel sets coaxially at two lateral sides of the common load body (L100), a flexibility transmission device composed of a dual shaft connecting device having slip coupling torque is installed, so that when controlling one of the individually-controlled output end clutch device to perform engaging transmission and controlling the other output end clutch device coaxially at the opposite side to perform terminating transmission, through the flexibility transmission device performing the flexibility transmission with differential rotational speed from the engaging transmission side to the terminating transmission side, the rotational speed of the wheel set at the terminating transmission side of the output end clutch device is lower than that of the wheel set at the engaging transmission side, but still equipped with the driving power in a lower speed.

(b) Description of the Prior Art

When a conventional single power performs differential driving to two or more than two individual loads of a common load body, a differential wheel set is often used for achieving the function of forming differential speed, the mentioned means has a shortage of not being able to generate the torque differential between the two loads, or when a clutch device is released for driving an inner wheel, an disadvantage of no driving power applied to the inner wheel is caused.

SUMMARY OF THE INVENTION

According to the present invention, the differential drive system having individual clutch control and mutual flexibility transmission utilizes the rotary kinetic power of a rotary kinetic power source to directly drive a first transmission device (T101), or through an input end clutch device (CL101) to drive the first transmission device (T101), and between the output end of the first transmission device (T101) and two or more than two loading wheel sets driven thereby, an output end transmission device is individually installed for driving the loading wheel sets arranged at two sides of a common load body (L100), so as to drive the combined common load body, and an individually-controlled output end clutch device is installed for driving the output end transmission device and the driven wheel set and the wheel shaft to perform engaging transmission or terminating transmission, and between the wheel shafts of the loading wheel sets coaxially at two lateral sides of the common load body (L100), a flexibility transmission device composed of a dual shaft connecting device having slip coupling torque is installed, so that when controlling one of the individually-controlled output end clutch device to perform engaging transmission and controlling the other output end clutch device coaxially at the opposite side to perform terminating transmission, through the flexibility transmission device performing the flexibility transmission with differential rotational speed from the engaging transmission side to the terminating transmission side, the rotational speed of the wheel set at the terminating transmission side of the output end clutch device is lower than that of the wheel set at the engaging transmission side, but still equipped with the driving power in a lower speed.

DESCRIPTION OF MAIN COMPONENT SYMBOLS

Figure 1:
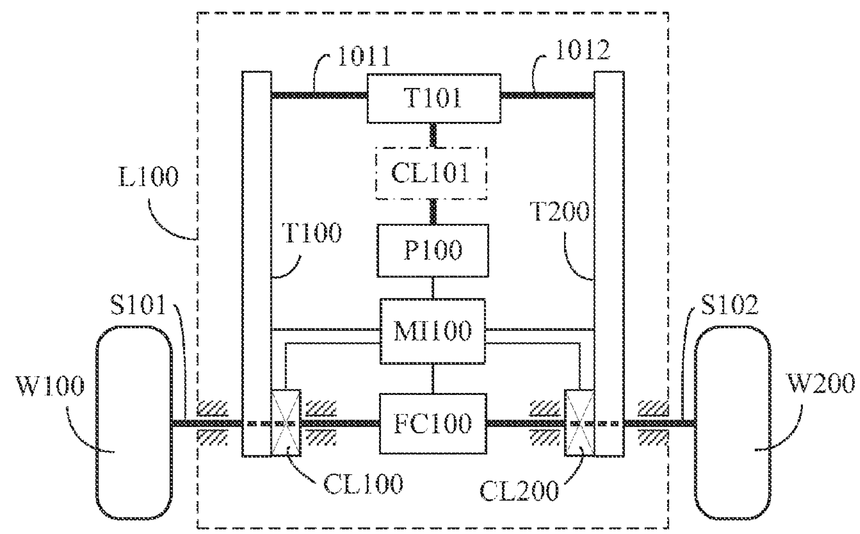
FIG. 1 is a schematic view showing the basic system structure according to the present invention.

B100: Electric power source
CL101: Input end clutch device
CL100, CL200, CL300, CL400, CL500, CL600: Output end clutch device
1011, 1012: Output shaft of first transmission device
S100: Direction changing signal sensor
S101, S103, S105: Left side wheel shaft
S102, S104, S106: Right side wheel shaft
ECU100: Control unit
L100: Common load body
MI100: External operation interface
P100: Rotary kinetic power source
FC100, FC200, FC300: Flexibility transmission device
T101: First transmission device
T100, T200, T300, T400, T500, T600: Output end transmission device
W100, W200, W300, W400, W500, W600: Wheel set

DETAILED DESCRIPTION OF THE PREFERRED EMBODIMENTS

When a conventional single power performs differential driving to two or more than two individual loads of a common load body, a differential wheel set is often used for achieving the function of forming differential speed, the mentioned means has a shortage of not being able to generate the torque differential between the two loads, or when a clutch device is released for driving an inner wheel, an disadvantage of no driving power applied to the inner wheel is caused.

According to the present invention, the differential drive system having individual clutch control and mutual flexibility transmission utilizes the rotary kinetic power of a rotary kinetic power source to directly drive a first transmission device (T101), or through an input end clutch device (CL101) to drive the first transmission device (T101), and between the output end of the first transmission device (T101) and two or more than two loading wheel sets driven thereby, an output end transmission device is individually installed for driving the loading wheel sets arranged at two sides of a common load body (L100), so as to drive the combined common load body, and an individually-controlled output end clutch device is installed for driving the output end transmission device and the driven wheel set and the wheel shaft to perform engaging transmission or terminating transmission, and between the wheel shafts of the loading wheel sets axially defined at two lateral sides of the common load body (L100), a flexibility transmission device composed of a dual shaft connecting device having slip coupling torque is installed, so that when controlling one of the individually-controlled output end clutch device to perform engaging transmission and controlling the other output end clutch device coaxially at the opposite side to perform terminating transmission, through the flexibility transmission device performing the flexibility transmission with differential rotational speed from the engaging transmission side to the terminating transmission side, the rotational speed of the wheel set at the terminating transmission side of the output end clutch device is lower than that of the wheel set at the engaging transmission side, but still equipped with the driving power in a lower speed.

Several embodiments for illustrating the present invention are as followings:

FIG. 1 is a schematic view showing the basic system structure according to the present invention;

As shown in FIG. 1, the common load body (L100) is installed with a first transmission device (T101) driven by the rotary kinetic power of a rotary kinetic power source (P100), an output end transmission device (T100) is installed between an output shaft of first transmission device (1011) of the first transmission device (T101) and a left side wheel set (W100) of the loading end, and an output end clutch device (CL100) is installed at the input end of a left side wheel shaft (S101) combined with the wheel set (W100), and an output end transmission device (T200) is installed between an output shaft of first transmission device (1012) and a right side wheel set (W200), and an output end clutch device (CL200) is installed at the input end of a right side wheel shaft (S102) combined with the wheel set (W200), and dual end shafts of a flexibility transmission device (FC100) are respectively connected to the left side wheel shaft (S101) and the right side wheel shaft (S102), which mainly consists of:

- rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;
- input end clutch device (CL101): installed between the output end of the rotary kinetic power source (P100) and the input end of the first transmission device (T101), capable of controlling the rotary kinetic power source (P100) to control the transmission or termination of the rotary kinetic power to the first transmission device (T101); the input end clutch device (CL101) includes being controlled by manual force or centrifugal force, or being controlled through the external operation interface (MI100), and formed as a clutch device or structure driven by electric force and/or magnetic force and/or mechanical force and/or air pressure and/or hydraulic force for performing transmission engaging or releasing, and having a rotary input end and a rotary output end; the input end clutch device (CL101) can be optionally installed according to actual needs;
- first transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the input ends of the output end transmission device (T100) and the output end transmission device (T200), including a single side output shaft for driving all wheel sets, or an output shaft of first transmission device (1011) and an output shaft of first transmission device (1012) having output shafts at two sides, so that the wheel sets installed at two sides of the common load body (L100) can be respectively driven through the output end transmission device (T100) and the output end transmission device (T200);
- external operation interface (MI100): related to a linear analog type, or digital type, or hybrid type external control device, constituted by a operation mechanisms and/or electromechanical devices, and/or solid state electric circuits which are controlled by manual force, mechanical force or electric power, provided for controlling the operation state of the rotary kinetic power source (P100), and/or controlling the operation of the flexibility transmission device (FC100) and/or the output end transmission device (T100), the output end transmission device (T200), and/or the output end clutch device (CL100), the output end clutch device (CL200) and the input end clutch device (CL101);
- flexibility transmission device (FC100): constituted by a limited slip differential or a dual shaft connecting device having slip damp coupling torque, including a flexibility transmission device having dual shaft structure and formed through fluid viscous effect, hydrodynamic damp effect, mechanical friction effect, electromagnetic vortex effect or power generation reverse torque effect; wherein two rotating ends thereof are respectively connected to the left side wheel shaft (S101) combined with the wheel set (W100) at the left side of the loading end, and the right side wheel shaft (S102) combined with the wheel set (W200) at the right side; during the driving operation, because the unstable operation caused by the individual load varying at the left or the right sides of the loading end, the slip damp coupling torque of the flexibility transmission device (FC100) installed between the wheel sets at the right and the left sides can perform mutual kinetic power transmission;
- output end transmission device (T100), (T200): the input end of the output end transmission device (T100) is driven by the rotary kinetic power from the output shaft of first transmission device (1011), and the output end thereof is served to drive the left side wheel set (W100) of the loading end; the input end of the output end transmission device (T200) is driven by the rotary kinetic power from the output shaft of first transmission device (1012), and the output end thereof is served to drive the right side wheel set (W200); the output end transmission device (T100) and the output end transmission device (T200) are consisted of mechanical gear sets, or chain sets or pulley sets or linkage rod sets, and composed of a transmission device having fixed speed ratio for acceleration or deceleration or changing direction, or a manually-operated or automatic or semi-automatic speed ratio varying or belt type continuous variable transmission, or a hydraulic torque converter; the output end transmission devices (T100), (T200) can be optionally installed according to actual needs;

output end clutch device (CL100), (CL200): the output end clutch device (CL100) is installed at the input end of the left side wheel shaft (S101) connected with the wheel set (W100) for controlling the rotary kinetic power outputted to the wheel set (W100); the output end clutch device (CL200) is installed at the input end of the right side wheel shaft (S102) connected with the wheel set (W200), for controlling the rotary kinetic power outputted to the wheel set (W200); the output end clutch device (CL100) and the output end clutch device (CL200) include being controlled by manual force or centrifugal force, or controlled by the external operation interface (MI100); or a clutch device or structure having function of performing transmission engaging or releasing while being driven by electric force and/or magnetic force and/or mechanical force and/or air pressure and/or hydraulic force, and has a rotary input end and a rotary output end; the output end clutch device can further include a function of being driven by electric force and/or magnetic force and/or mechanical force and/or air pressure and/or hydraulic force for controlling the coupling torque between engaging and releasing, e.g. an electromagnetic wet type multi-plate clutch device controlling coupling torque through exciting current, or a wet type multi-plate clutch device driven by mechanical force and/or pressure and/or hydraulic force;

The structure of the output end clutch device (CL100), (CL200) includes:

(1) a clutch device or structure driven by the electric force and/or magnetic force and/or mechanical force and/or air pressure and/or hydraulic force for performing transmission engaging or releasing;

(2) driven by the electric force and/or magnetic force and/or mechanical force and/or air pressure and/or hydraulic force for linearly controlling the continuous coupling torque between transmission engaging and releasing;

(3) driven by the electric force and/or magnetic force and/or mechanical force and/or air pressure and/or hydraulic force for performing transmission engaging or releasing, and having torque limited coupling function which is smaller than the engaging torque, after being released;

(4) driven by the electric force and/or magnetic force and/or mechanical force and/or air pressure and/or hydraulic force for performing transmission engaging or releasing, and having a linear damp function which is smaller than the engaging torque and is increased while the rotation differential is increased, after being released;

(5) driven by the electric force and/or magnetic force and/or mechanical force and/or air pressure and/or hydraulic force for performing transmission engaging or releasing, and having a linear damp function which is smaller than the engaging torque and is reduced while the rotation differential is increased, after being released;

(6) (1) to (5) including a radial clutch device;

(7) (1) to (5) including an axial clutch device;

—common load body (L100) can be installed with one or more than one non-powered wheels according to actual needs;

By operating the mentioned devices, when the common load body (L100) is driven by the rotary kinetic power source (P100) to operate, and differential speed operation for turning direction is performed at the wheel set (W100) at the left side and the wheel set (W200) at the right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC100), so that the rotational speed of the inner wheel set is lower than that of the outer wheel set but still equipped with the driving power.

Figure 2:
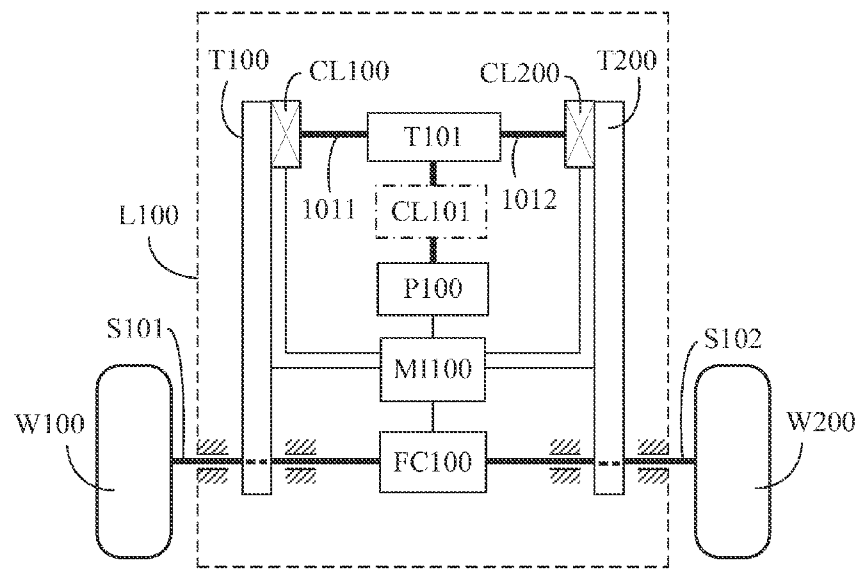
FIG. 2 is schematic view showing the system structure of FIG. 1 wherein the output end clutch device being installed at the output end of the first transmission device (T101).

FIG. 2 is schematic view showing the system structure of FIG. 1 wherein the output end clutch device being installed at the output end of the first transmission device (T101);

As shown in FIG. 2, in the embodiment disclosed in FIG. 1, the output end clutch device (CL100) is installed at the output shaft of first transmission device (1011); the output end clutch device (CL200) is installed at the output shaft of first transmission device (1022), which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

input end clutch device (CL101): installed between the output end of the rotary kinetic power source (P100) and the input end of the first transmission device (T101), capable of controlling the rotary kinetic power source (P100) to control the transmission or termination of the rotary kinetic power to the first transmission device (T101); the input end clutch device (CL101) includes being controlled by manual force or centrifugal force, or being controlled through the external operation interface (MI100), and formed as a clutch device or structure driven by electric force and/or magnetic force and/or mechanical force and/or air pressure and/or hydraulic force for performing transmission engaging or releasing, and having a rotary input end and a rotary output end; the input end clutch device (CL101) can be optionally installed according to actual needs;

first transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the input ends of the output end transmission device (T100) and the output end transmission device (T200), including a single side output shaft for driving all wheel sets, or an output shaft of first transmission device (1011) and an output shaft of first transmission device (1012) having output shafts at two sides, so that the wheel sets installed at two sides of the common load body (L100) can be respectively driven through the output end transmission device (T100) and the output end transmission device (T200);

external operation interface (MI100): related to a linear analog type, or digital type, or hybrid type external control device, constituted by a operation mechanisms and/or electromechanical devices, and/or solid state electric circuits which are controlled by manual force, mechanical force or electric power, provided for controlling the operation state of the rotary kinetic power source (P100), and/or controlling the operation of the flexibility transmission device (FC100) and/or the output end transmission device (T100), the output end transmission device (T200), and/or the output end clutch device (CL100), the output end clutch device (CL200) and the input end clutch device (CL101);

flexibility transmission device (FC100): constituted by a limited slip differential or a dual shaft connecting device having slip damp coupling torque, including a flexibility transmission device having dual shaft structure and formed through fluid viscous effect, hydrodynamic damp effect, mechanical friction effect, electromagnetic vortex effect or power generation reverse torque effect; two rotating ends thereof are respectively connected to the left side wheel shaft (S101) combined with the wheel set (W100) at the left side of the loading end, and the right side wheel shaft (S102) combined with the wheel set (W200) at the right side; during the driving operation, because the unstable operation caused by the individual load varying at the left or the right sides of the loading end, the slip damp coupling torque of the flexibility transmission device (FC100) installed between the wheel sets at the right and the left sides can perform mutual kinetic power transmission;

output end transmission device (T100), (T200): the output end of the output end transmission device (T100) is served to drive the left side wheel set (W100) of the loading end, and the input end thereof is driven by the rotary kinetic power from the output shaft of first transmission device (1011); the output end of the output end transmission device (T200) is served to drive the right side wheel set (W200), and the input end thereof is driven by the rotary kinetic power from the output shaft of first transmission device (1012); the output end transmission device (T100) and the output end transmission device (T200) are consisted of mechanical gear sets, or chain sets or pulley sets or linkage rod sets, and composed of a transmission device having fixed speed ratio for acceleration or deceleration or changing direction, or a manually-operated or automatic or semi-automatic speed ratio varying or belt type continuous variable transmission, or a hydraulic torque converter; the output end transmission devices (T100), (T200) can be optionally installed according to actual needs;

output end clutch device (CL100), (CL200): the output end clutch device (CL100) is installed at the output end of the output shaft of first transmission device (1011) for controlling the rotation kinetic power outputted to the wheel set (W100), and the output end clutch device (CL200) is installed at the output end of the output shaft of first transmission device (1012) for controlling the rotary kinetic power outputted to the wheel set (W200); the output end clutch device (CL100) and the output end clutch device (CL200) include being controlled by manual force or centrifugal force, or controlled by the external operation interface (MI100); or a clutch device or structure having function of performing transmission engaging or releasing while being driven by electric force and/or magnetic force and/or mechanical force and/or air pressure and/or hydraulic force, and has a rotary input end and a rotary output end; the output end clutch device can further include a function of being driven by electric force and/or magnetic force and/or mechanical force and/or air pressure and/or hydraulic force for controlling the coupling torque between engaging and releasing, e.g. an electromagnetic wet type multi-plate clutch device controlling coupling torque through exciting current, or a wet type multi-plate clutch device driven by mechanical force and/or pressure and/or hydraulic force;

The structure of the output end clutch device (CL100), (CL200) includes:

(1) a clutch device or structure driven by the electric force and/or magnetic force and/or mechanical force and/or air pressure and/or hydraulic force for performing transmission engaging or releasing;

(2) driven by the electric force and/or magnetic force and/or mechanical force and/or air pressure and/or hydraulic force for linearly controlling the continuous coupling torque between transmission engaging and releasing;

(3) driven by the electric force and/or magnetic force and/or mechanical force and/or air pressure and/or hydraulic force for performing transmission engaging or releasing, and having torque limited coupling function which is smaller than the engaging torque, after being released;

(4) driven by the electric force and/or magnetic force and/or mechanical force and/or air pressure and/or hydraulic force for performing transmission engaging or releasing, and having a linear damp function which is smaller than the engaging torque and is increased while the rotation differential is increased, after being released;

(5) driven by the electric force and/or magnetic force and/or mechanical force and/or air pressure and/or hydraulic force for performing transmission engaging or releasing, and having a linear damp function which is smaller than the engaging torque and is reduced while the rotation differential is increased, after being released;

(6) (1) to (5) including a radial clutch device;

(7) (1) to (5) including an axial clutch device;

common load body (L100) can be installed with one or more than one non-powered wheels according to actual needs;

By operating the mentioned devices, when the common load body (L100) is driven by the rotary kinetic power source (P100) to operate, and differential speed operation for turning direction is performed at the wheel set (W100) at the left side and the wheel set (W200) at the right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC100), so that the rotational speed of the inner wheel set is lower than that of the outer wheel set but still equipped with the driving power.

Figure 3:
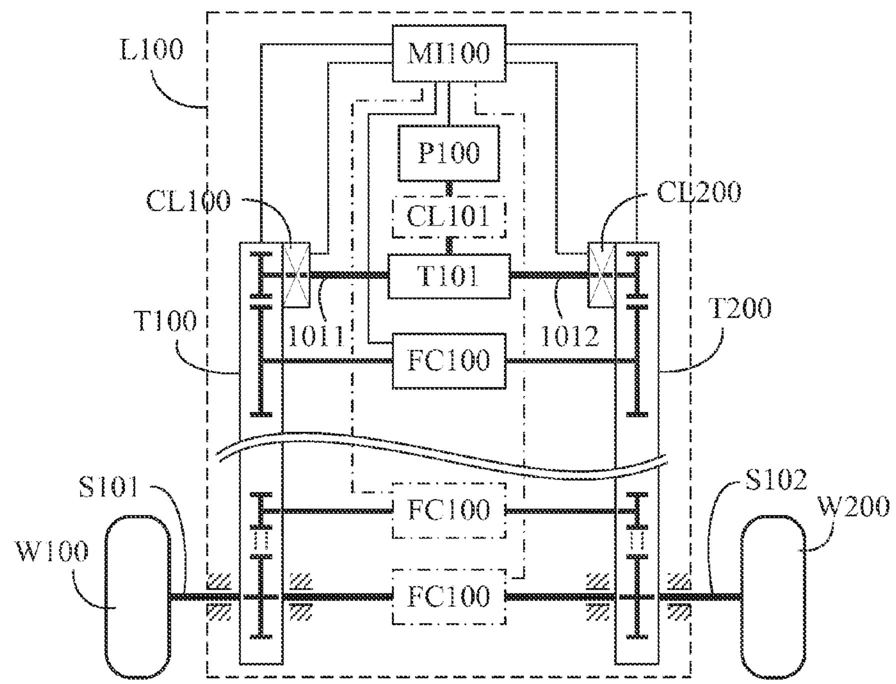
FIG. 3 is a schematic view showing the installation locations of the flexibility transmission device in the system structure of FIG. 1.

FIG. 3 is a schematic view showing the installation locations of the flexibility transmission device in the system structure of FIG. 1;

As shown in FIG. 3, in the embodiment disclosed in FIG. 1, the flexibility transmission device (FC100) is installed between the left side wheel shaft (S101) and the right side wheel shaft (S102), or installed between the input ends of the output end transmission device (T100) and the output end transmission device (T200), or installed between internal transmission structures of the output end transmission device itself, which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

input end clutch device (CL101): installed between the output end of the rotary kinetic power source (P100) and the input end of the first transmission device (T101), capable of controlling the rotary kinetic power source (P100) to control the transmission or termination of the rotary kinetic power to the first transmission device (T101); the input end clutch device (CL101) includes being controlled by manual force or centrifugal force, or being controlled through the external operation interface (MI100), and formed as a clutch device or structure driven by electric force and/or magnetic force and/or mechanical force and/or air pressure and/or hydraulic force for performing transmission engaging or releasing, and having a rotary input end and a rotary output end; the input end clutch device (CL101) can be optionally installed according to actual needs;

first transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the input ends of the output end transmission device (T100) and the output end transmission device (T200), including a single side output shaft for driving all wheel sets, or an output shaft of first transmission device (1011) and an output shaft of first transmission device (1012) having output shafts at two sides, so that the wheel sets installed at two sides of the common load body (L100) can be respectively driven through the output end transmission device (T100) and the output end transmission device (T200);

external operation interface (MI100): related to a linear analog type, or digital type, or hybrid type external control device, constituted by a operation mechanisms and/or electromechanical devices, and/or solid state electric circuits which are controlled by manual force, mechanical force or electric power, provided for controlling the operation state of the rotary kinetic power source (P100), and/or controlling the operation of the flexibility transmission device (FC100) and/or the output end transmission device (T100), the output end transmission device (T200), and/or the output end clutch device (CL100), the output end clutch device (CL200) and the input end clutch device (CL101);

flexibility transmission device (FC100): constituted by a limited slip differential or a dual shaft connecting device having slip damp coupling torque, including a flexibility transmission device having dual shaft structure and formed through fluid viscous effect, hydrodynamic damp effect, mechanical friction effect, electromagnetic vortex effect or power generation reverse torque effect; two rotating ends thereof are respectively connected to the left side wheel shaft (S101) combined with the wheel set (W100) at the left side of the loading end, and the right side wheel shaft (S102) combined with the wheel set (W200) at the right side, or connected between the transmission components having the same rotational speed while being in the normal straight running state installed in the transmission wheel train of the output end transmission device (T100) and the output end transmission device (T200); during the driving operation, because the unstable operation caused by the individual load varying at the left or the right sides of the loading end, the slip damp coupling torque of the flexibility transmission device (FC100) installed between the wheel sets at the right and the left sides can perform mutual kinetic power transmission;

output end transmission device (T100), (T200): the output end of the output end transmission device (T100) is served to drive the left side wheel set (W100) of the loading end, and the input end thereof is driven by the rotary kinetic power from the output shaft of first transmission device (1011); the output end of the output end transmission device (T200) is served to drive the right side wheel set (W200), and the input end thereof is driven by the rotary kinetic power from the output shaft of first transmission device (1012); the output end transmission device (T100) and the output end transmission device (T200) are consisted of mechanical gear sets, or chain sets or pulley sets or linkage rod sets, and composed of a transmission device having fixed speed ratio for acceleration or deceleration or changing direction, or a manually-operated or automatic or semi-automatic speed ratio varying or belt type continuous variable transmission, or a hydraulic torque converter; the output end transmission devices (T100), (T200) can be optionally installed according to actual needs;

output end clutch device (CL100), (CL200): the output end clutch device (CL100) is installed at the output end of the output shaft of first transmission device (1011) for controlling the rotation kinetic power outputted to the wheel set (W100), and the output end clutch device (CL200) is installed at the output end of the output shaft of first transmission device (1012) for controlling the rotary kinetic power outputted to the wheel set (W200); the output end clutch device (CL100) and the output end clutch device (CL200) include being controlled by manual force or centrifugal force, or controlled by the external operation interface (MI100); or a clutch device or structure having function of performing transmission engaging or releasing while being driven by electric force and/or magnetic force and/or mechanical force and/or air pressure and/or hydraulic force, and has a rotary input end and a rotary output end; the output end clutch device can further include a function of being driven by electric force and/or magnetic force and/or mechanical force and/or air pressure and/or hydraulic force for controlling the coupling torque between engaging and releasing, e.g. an electromagnetic wet type multi-plate clutch device controlling coupling torque through exciting current, or a wet type multi-plate clutch device driven by mechanical force and/or pressure and/or hydraulic force;

The structure of the output end clutch device (CL100), (CL200) includes:

(1) a clutch device or structure driven by the electric force and/or magnetic force and/or mechanical force and/or air pressure and/or hydraulic force for performing transmission engaging or releasing;

(2) driven by the electric force and/or magnetic force and/or mechanical force and/or air pressure and/or hydraulic force for linearly controlling the continuous coupling torque between transmission engaging and releasing;

(3) driven by the electric force and/or magnetic force and/or mechanical force and/or air pressure and/or hydraulic force for performing transmission engaging or releasing, and having torque limited coupling function which is smaller than the engaging torque, after being released;

(4) driven by the electric force and/or magnetic force and/or mechanical force and/or air pressure and/or hydraulic force for performing transmission engaging or releasing, and having a linear damp function which is smaller than the engaging torque and is increased while the rotation differential is increased, after being released;

(5) driven by the electric force and/or magnetic force and/or mechanical force and/or air pressure and/or hydraulic force for performing transmission engaging or releasing, and having a linear damp function which is smaller than the engaging torque and is reduced while the rotation differential is increased, after being released;

(6) (1) to (5) including a radial clutch device;

(7) (1) to (5) including an axial clutch device;

common load body (L100) can be installed with one or more than one non-powered wheels according to actual needs;

By operating the mentioned devices, when the common load body (L100) is driven by the rotary kinetic power source (P100) to operate, and differential speed operation for turning direction is performed at the wheel set (W100) at the left side and the wheel set (W200) at the right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC100), so that the rotational speed of the inner wheel set is lower than that of the outer wheel set but still equipped with the driving power.

Figure 4:
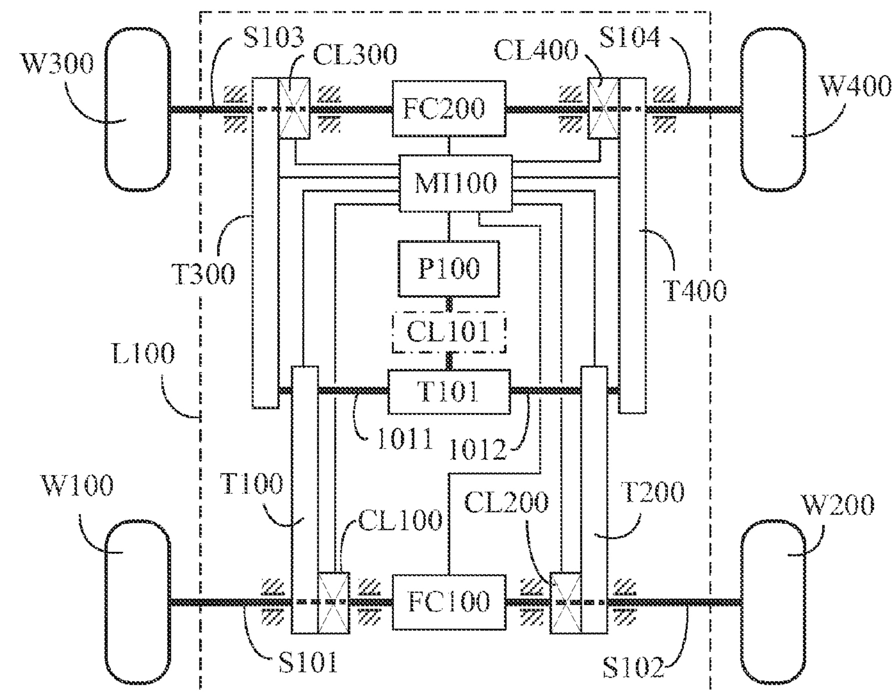
FIG. 4 is a schematic structural view showing the embodiment disclosed in FIG. 1 being further formed as a four wheel drive system.

FIG. 4 is a schematic structural view showing the embodiment disclosed in FIG. 1 being further formed as a four wheel drive system;

As shown in FIG. 4, in the embodiment disclosed in FIG. 1, the output end transmission devices (T100), (T300) are individually installed between the output shaft of first transmission device (1011) of the first transmission device (T101) and the wheel set (W100) at the rear left side and the wheel set (W300) at the front left side of the loading end, the output end clutch device (CL100) is installed between the output end of the output end transmission device (T100) and the transmission wheel train of the left side wheel shaft (S101) connected with the wheel set (W100), and the output end clutch device (CL300) is installed between the output end of the output end transmission device (T300) and the transmission wheel train of the left right wheel shaft (S103) connected with the wheel set (W300), and the output end transmission devices (T200), (T400) are individually installed between the output shaft of first transmission device (1012) and the wheel set (W200) at the rear right side and the wheel set (W400) at the front right side, and the output end clutch device (CL200) is installed between the output end of the output end transmission device (T200) and the transmission wheel train of the right side wheel shaft (S102) connected with the wheel set (W200), and the output end clutch device (CL400) is installed between the output end of the output end transmission device (T400) and the transmission wheel train of the right side wheel shaft (S104) connected with the wheel set (W400), and the dual shafts of the flexibility transmission device (FC100) are respectively connected between the left side wheel shaft (S101) and the right side wheel shaft (S102), and the dual shafts of the flexibility transmission device (FC200) are respectively connected between the left side wheel shaft (S103) and the right side wheel shaft (S104), which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

input end clutch device (CL101): installed between the output end of the rotary kinetic power source (P100) and the input end of the first transmission device (T101), capable of controlling the rotary kinetic power source (P100) to control the transmission or termination of the rotary kinetic power to the first transmission device (T101); the input end clutch device (CL101) includes being controlled by manual force or centrifugal force, or being controlled through the external operation interface (MI100), and formed as a clutch device or structure driven by electric force and/or magnetic force and/or mechanical force and/or air pressure and/or hydraulic force for performing transmission engaging or releasing, and having a rotary input end and a rotary output end; the input end clutch device (CL101) can be optionally installed according to actual needs;

first transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the input ends of the output end transmission devices (T100), (T200), (T300), (T400), including a single side output shaft for driving all wheel sets, or an output shaft of first transmission device (1011) and an output shaft of first transmission device (1012) having output shafts at two sides, so that the wheel sets installed at two sides of the common load body (L100) can be respectively driven through the output end transmission devices (T100), (T200), (T300), (T400);

external operation interface (MI100): related to a linear analog type, or digital type, or hybrid type external control device, constituted by a operation mechanisms and/or electromechanical devices, and/or solid state electric circuits which are controlled by manual force, mechanical force or electric power, provided for controlling the operation state of the rotary kinetic power source (P100), and/or controlling the operation of the flexibility transmission device (FC100), (FC200) and/or the output end transmission devices (T100), (T200), (T300), (T400), and/or the output end clutch devices (CL100), (CL200), (CL300), (CL400) and the input end clutch device (CL101);

flexibility transmission device (FC100), (FC200): constituted by a limited slip differential or a dual shaft connecting device having slip damp coupling torque, including a flexibility transmission device having dual shaft structure and formed through fluid viscous effect, hydrodynamic damp effect, mechanical friction effect, electromagnetic vortex effect or power generation reverse torque effect; wherein two rotating ends of the flexibility transmission device (FC100) are respectively connected to the left side wheel shaft (S101) combined with the wheel set (W100) at the rear left side of the loading end, and the right side wheel shaft (S102) combined with the wheel set (W200) at the rear right side, and two rotating ends of the flexibility transmission device (FC200) are respectively connected to the left side wheel shaft (S103) combined with the wheel set (W300) at the front left side of the loading end, and the right side wheel shaft (S104) combined with the wheel set (W400) at the front right side; during the driving operation, because the unstable operation caused by the individual load varying at the left or the right sides of the loading end, the slip damp coupling torque of the flexibility transmission device (FC100) and/or the flexibility transmission device (FC200) installed between the wheel sets at the opposite right and left sides can perform mutual kinetic power transmission;

output end transmission device (T100), (T200), (T300), (T400): the output end of the output end transmission device (T100) is served to drive the wheel set (W100) at the rear left side of the loading end, and the input end thereof is driven by the rotary kinetic power from the output shaft of first transmission device (1011); the output end of the output end transmission device (T200) is served to drive the wheel set (W200) at the rear right side, and the input end thereof is driven by the rotary kinetic power from the output shaft of first transmission device (1012); the output end of the output end transmission device (T300) is served to drive the wheel set (W300) at the front left side of the loading end, and the input end thereof is driven by the rotary kinetic power from the output shaft of first transmission device (1011); the output end of the output end transmission device (T400) is served to drive the wheel set (W400) at the front right side, and the input end thereof is driven by the rotary kinetic power from the output shaft of first transmission device (1012); the output end transmission devices (T100), (T200), (T300), (T400) are consisted of mechanical gear sets, or chain sets or pulley sets or linkage rod sets, and composed of a transmission device having fixed speed ratio for acceleration or deceleration or changing direction, or a manually-operated or automatic or semi-automatic speed ratio varying or belt type continuous variable transmission, or a hydraulic torque converter; the output end transmission devices (T100), (T200) and/or (T300), (T400) can be optionally installed according to actual needs;

output end clutch device (CL100), (CL200), (CL300), (CL400): the output end clutch device (CL100) is installed between the output shaft of first transmission device (1011) and the transmission wheel train of the left side wheel shaft (S101) combined with the wheel set (W100) for controlling the rotary kinetic power outputted to the wheel set (W100), the output end clutch device (CL200) is installed between the output shaft of first transmission device (1012) and the transmission wheel train of the right side wheel shaft (S102) combined with the wheel set (W200) for controlling the rotary kinetic power outputted to the wheel set (W200), the output end clutch device (CL300) is installed between the output shaft of first transmission device (1011) and the transmission wheel train of the left side wheel shaft (S103) combined with the wheel set (W300) for controlling the rotation kinetic power outputted to the wheel set (W300), and the output end clutch device (CL400) is installed between the output shaft of first transmission device (1012) and the transmission wheel train of the right side wheel shaft (S104) combined with the wheel set (W400) for controlling the rotation kinetic power outputted to the wheel set (W400); the output end clutch devices (CL100), (CL200), (CL300), (CL400) include being controlled by manual force or centrifugal force, or controlled by the external operation interface (MI100), or a clutch device or structure having function of performing transmission engaging or releasing while being driven by electric force and/or magnetic force and/or mechanical force and/or air pressure and/or hydraulic force, and has a rotary input end and a rotary output end; the output end clutch device can further include a function of being driven by electric force and/or magnetic force and/or mechanical force and/or air pressure and/or hydraulic force for controlling the coupling torque between engaging and releasing, e.g. an electromagnetic wet type multi-plate clutch device controlling coupling torque through exciting current, or a wet type multi-plate clutch device driven by mechanical force and/or pressure and/or hydraulic force;

The structure of the output end clutch device (CL100), (CL200), (CL300), (CL400) includes:

(1) a clutch device or structure driven by the electric force and/or magnetic force and/or mechanical force and/or air pressure and/or hydraulic force for performing transmission engaging or releasing;

(2) driven by the electric force and/or magnetic force and/or mechanical force and/or air pressure and/or hydraulic force for linearly controlling the continuous coupling torque between transmission engaging and releasing;

(3) driven by the electric force and/or magnetic force and/or mechanical force and/or air pressure and/or hydraulic force for performing transmission engaging or releasing, and having torque limited coupling function which is smaller than the engaging torque, after being released;

(4) driven by the electric force and/or magnetic force and/or mechanical force and/or air pressure and/or hydraulic force for performing transmission engaging or releasing, and having a linear damp function which is smaller than the engaging torque and is increased while the rotation differential is increased, after being released;

(5) driven by the electric force and/or magnetic force and/or mechanical force and/or air pressure and/or hydraulic force for performing transmission engaging or releasing, and having a linear damp function which is smaller than the engaging torque and is reduced while the rotation differential is increased, after being released;

(6) (1) to (5) including a radial clutch device;

(7) (1) to (5) including an axial clutch device;

The mentioned output end clutch devices (CL100), (CL200) at the rear end of the common load body (L100) are necessary to be installed, and the output end clutch devices (CL300), (CL400) can be optionally installed according to actual needs;

common load body (L100) can be installed with one or more than one non-powered wheels according to actual needs;

By operating the mentioned devices, when the common load body (L100) is driven by the rotary kinetic power source (P100) to operate, and differential speed operation for turning direction is performed at the wheel set (W100) at the rear left side and the wheel set (W200) at the rear right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC100), so that the rotational speed of the inner wheel set is lower than that of the outer wheel set but still equipped with the driving power; and when the differential speed operation for turning direction is performed at the wheel set (W300) at the front left side and the wheel set (W400) at the front right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC200), so that the rotational speed of the inner wheel set is lower than that of the outer wheel set but still equipped with the driving power.

Figure 5:
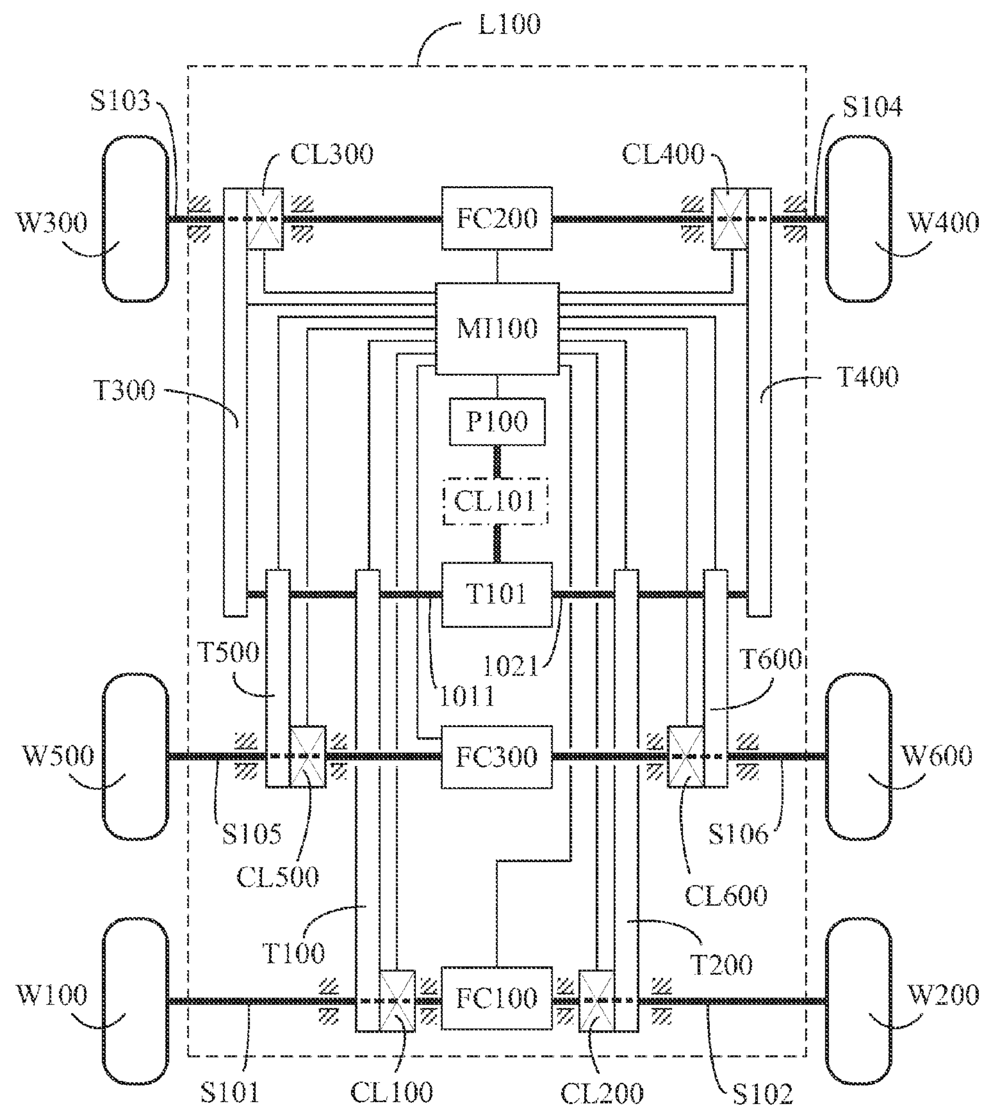
FIG. 5 is a schematic structural view showing the embodiment disclosed in FIG. 1 being further formed as a six wheel drive system.

FIG. 5 is a schematic structural view showing the embodiment disclosed in FIG. 1 being further formed as a six wheel drive system;

As shown in FIG. 5, in the embodiment disclosed in FIG. 1, the output end transmission devices (T100), (T300), (T500) are individually installed between the output shaft of first transmission device (1011) of the first transmission device (T101) and the wheel set (W100) at the rear left side, the wheel set (W300) at the front left side and the wheel set (W500) at the middle left side of the loading end, the output end clutch device (CL100) is installed between the output shaft of first transmission device (1011) and the transmission wheel train of the left side wheel shaft (S101) combined with the wheel set (W100), the output end clutch device (CL300) is installed between the output shaft of first transmission device (1011) and the transmission wheel train of the left side wheel shaft (S103) combined with the wheel set (W300), and the output end clutch device (CL500) is installed between the output shaft of first transmission device (1011) and the transmission wheel train of the left side wheel shaft (S105) combined with the wheel set (W500); the output end transmission devices (T200), (T400), (T600) are individually installed between the output shaft of first transmission device (1012) and the wheel set (W200) at the rear right side, the wheel set (W400) at the front right side and the wheel set (W600) at the middle right side, and the output end clutch device (CL200) is installed between the output shaft of first transmission device (1012) and the transmission wheel train of the right side wheel shaft (S102) combined with the wheel set (W200), the output end clutch device (CL400) is installed between the output shaft of first transmission device (1012) and the transmission wheel train of the right side wheel shaft (S104) combined with the wheel set (W400), and the output end clutch device (CL600) is installed between the output shaft of first transmission device (1012) and the transmission wheel train of the right side wheel shaft (S106) combined with the wheel set (W600); the dual shafts of the flexibility transmission device (FC100) are respectively connected between the left side wheel shaft (S101) and the right side wheel shaft (S102), the dual shafts of the flexibility transmission device (FC200) are respectively connected between the left side wheel shaft (S103) and the right side wheel shaft (S104), and the dual shafts of the flexibility transmission device (FC300) are respectively connected between the left side wheel shaft (S105) and the right side wheel shaft (S106), which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

input end clutch device (CL101): installed between the output end of the rotary kinetic power source (P100) and the input end of the first transmission device (T101), capable of controlling the rotary kinetic power source (P100) to control the transmission or termination of the rotary kinetic power to the first transmission device (T101); the input end clutch device (CL101) includes being controlled by manual force or centrifugal force, or being controlled through the external operation interface (MI100), and formed as a clutch device or structure driven by electric force and/or magnetic force and/or mechanical force and/or air pressure and/or hydraulic force for performing transmission engaging or releasing, and having a rotary input end and a rotary output end; the input end clutch device (CL101) can be optionally installed according to actual needs;

first transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the input ends of the output end transmission devices (T100), (T200), (T300), (T400), (T500), (T600) including a single side output shaft for driving all wheel sets, or an output shaft of first transmission device (1011) and an output shaft of first transmission device (1012) having output shafts at two sides, so that the wheel sets installed at two sides of the common load body (L100) can be respectively driven through the output end transmission devices (T100), (T200), (T300), (T400), (T500), (T600);

external operation interface (MI100): related to a linear analog type, or digital type, or hybrid type external control device, constituted by a operation mechanisms and/or electromechanical devices, and/or solid state electric circuits which are controlled by manual force, mechanical force or electric power, provided for controlling the operation state of the rotary kinetic power source (P100), and/or controlling the operation of the flexibility transmission device (FC100), (FC200), (FC300) and/or the output end transmission devices (T100), (T200), (T300), (T400), (T500), (T600), and/or the output end clutch devices (CL100), (CL200), (CL300), (CL400), (CL500), (CL600) and the input end clutch device (CL101);

flexibility transmission device (FC100), (FC200), (FC300): constituted by a limited slip differential or a dual shaft connecting device having slip damp coupling torque, including a flexibility transmission device having dual shaft structure and formed through fluid viscous effect, hydrodynamic damp effect, mechanical friction effect, electromagnetic vortex effect or power generation reverse torque effect; wherein two rotating ends of the flexibility transmission device (FC100) are respectively connected to the left side wheel shaft (S101) combined with the wheel set (W100) at the rear left side of the loading end, and the right side wheel shaft (S102) combined with the wheel set (W200) at the rear right side, two rotating ends of the flexibility transmission device (FC200) are respectively connected to the left side wheel shaft (S103) combined with the wheel set (W300) at the front left side of the loading end, and the right side wheel shaft (S104) combined with the wheel set (W400) at the front right side, and two rotating ends of the flexibility transmission device (FC300) are respectively connected to the left side wheel shaft (S105) combined with the wheel set (W500) at the middle left side of the loading end, and the right side wheel shaft (S106) combined with the wheel set (W600) at the middle right side; during the driving operation, because the unstable operation caused by the individual load varying at the left or the right sides of the loading end, the slip damp coupling torque of the flexibility transmission device (FC100) and/or the flexibility transmission device (FC200) and/or the flexibility transmission device (FC300) installed between the wheel sets at the opposite right and left sides can perform mutual kinetic power transmission;

output end transmission device (T100), (T200), (T300), (T400), (T500), (T600): the output end of the output end transmission device (T100) is served to drive the wheel set (W100) at the rear left side of the loading end, and the input end is driven by the rotary kinetic power from the output shaft of first transmission device (1011); the output end of the output end transmission device (T200) is served to drive the wheel set (W200) at the rear right side, and the input end thereof is driven by the rotary kinetic power from the output shaft of first transmission device (1012); the output end of the output end transmission device (T300) is served to drive the wheel set (W300) at the left side of the loading end, and the input end thereof is driven by the rotary kinetic power from the output shaft of first transmission device (1011); the output end of the output end transmission device (T400) is served to drive the wheel set (W400) at the front right side, and the input end thereof is driven by the rotary kinetic power from the output shaft of first transmission device (1012); the output end of the output end transmission device (T500) is served to drive the wheel set (W500) at the middle left side of the loading end, and the input end thereof is driven by the rotary kinetic power from the output shaft of first transmission device (1011); the output end of the output end transmission device (T600) is served to drive the wheel set (W600) at the middle right side of the loading end, and the input end thereof is driven by the rotary kinetic power from the output shaft of first transmission device (1012); the output end transmission devices (T100), (T200), (T300), (T400), (T500), (T600) are consisted of mechanical gear sets, or chain sets or pulley sets or linkage rod sets, and composed of a transmission device having fixed speed ratio for acceleration or deceleration or changing direction, or a manually-operated or automatic or semi-automatic speed ratio varying or belt type continuous variable transmission, or a hydraulic torque converter; the output end transmission devices (T100), (T200) and/or (T300), (T400), (T500), (T600) can be optionally installed according to actual needs;

output end clutch device (CL100), (CL200), (CL300), (CL400), (CL500), (CL600): the output end clutch device (CL100) is installed between the output shaft of first transmission device (1011) and the transmission wheel train of the wheel set (W100) for controlling the rotary kinetic power outputted to the wheel set (W100), the output end clutch device (CL200) is installed between the output shaft of first transmission device (1012) and the transmission wheel train of the wheel set (W200) for controlling the rotary kinetic power outputted to the wheel set (W200), the output end clutch device (CL300) is installed between the output shaft of first transmission device (1011) and the transmission wheel train of the wheel set (W300) for controlling the rotary kinetic power outputted to the wheel set (W300), the output end clutch device (CL400) is installed between the output shaft of first transmission device (1012) and the transmission wheel train of the wheel set (W400) for controlling the rotary kinetic power outputted to the wheel set (W400), the output end clutch device (CL500) is installed between the output shaft of first transmission device (1011) and the transmission wheel train of the wheel set (W500) for controlling the rotary kinetic power outputted to the wheel set (W500), and the output end clutch device (CL600) is installed between the output shaft of first transmission device (1012) and the transmission wheel train of the wheel set (W600) for controlling the rotary kinetic power outputted to the wheel set (W600); the output end clutch devices (CL100), (CL200), (CL300), (CL400), (CL500), (CL600) include being controlled by manual force or centrifugal force, or controlled by the external operation interface (MI100), or a clutch device or structure having function of performing transmission engaging or releasing while being driven by electric force and/or magnetic force and/or mechanical force and/or air pressure and/or hydraulic force, and has a rotary input end and a rotary output end; the output end clutch device can further include a function of being driven by electric force and/or magnetic force and/or mechanical force and/or air pressure and/or hydraulic force for controlling the coupling torque between engaging and releasing, e.g. an electromagnetic wet type multi-plate clutch device controlling coupling torque through exciting current, or a wet type multi-plate clutch device driven by mechanical force and/or pressure and/or hydraulic force;

The structure of the output end clutch device (CL100), (CL200), (CL300), (CL400), (CL500), (CL600) includes:

(1) a clutch device or structure driven by the electric force and/or magnetic force and/or mechanical force and/or air pressure and/or hydraulic force for performing transmission engaging or releasing;

(2) driven by the electric force and/or magnetic force and/or mechanical force and/or air pressure and/or hydraulic force for linearly controlling the continuous coupling torque between transmission engaging and releasing;

(3) driven by the electric force and/or magnetic force and/or mechanical force and/or air pressure and/or hydraulic force for performing transmission engaging or releasing, and having torque limited coupling function smaller than the engaging torque, after being released;

(4) driven by the electric force and/or magnetic force and/or mechanical force and/or air pressure and/or hydraulic force for performing transmission engaging or releasing, and having a linear damp function which is smaller than the engaging torque and is increased while the rotation differential is increased, after being released;

(5) driven by the electric force and/or magnetic force and/or mechanical force and/or air pressure and/or hydraulic force for performing transmission engaging or releasing, and having a linear damp function which is smaller than the engaging torque and is reduced while the rotation differential is increased, after being released;

(6) (1) to (5) including a radial clutch device;

(7) (1) to (5) including an axial clutch device;

The mentioned output end clutch devices (CL100), (CL200) at the rear end of the common load body (L100) are necessary to be installed, and the output end clutch devices (CL300), (CL400), (CL500), (CL600) can be optionally installed according to actual needs;

common load body (L100) can be installed with one or more than one non-powered wheels according to actual needs;

By operating the mentioned devices, when the common load body (L100) is driven by the rotary kinetic power source (P100) to operate, and differential speed operation for turning direction is performed at the wheel set (W100) at the rear left side and the wheel set (W200) at the rear right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC100), so that the rotational speed of the inner wheel set is lower than that of the outer wheel set but still equipped with the driving power; and when the differential speed operation for turning direction is performed at the wheel set (W300) at the front left side and the wheel set (W400) at the front right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC200), so that the rotational speed of the inner wheel set is lower than that of the outer wheel set but still equipped with the driving power; and when the differential speed operation for turning direction is performed at the wheel set (W500) at the middle left side and the wheel set (W600) at the middle right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC300), so that the rotational speed of the inner wheel set is lower than that of the outer wheel set but still equipped with the driving power.

Figure 6:
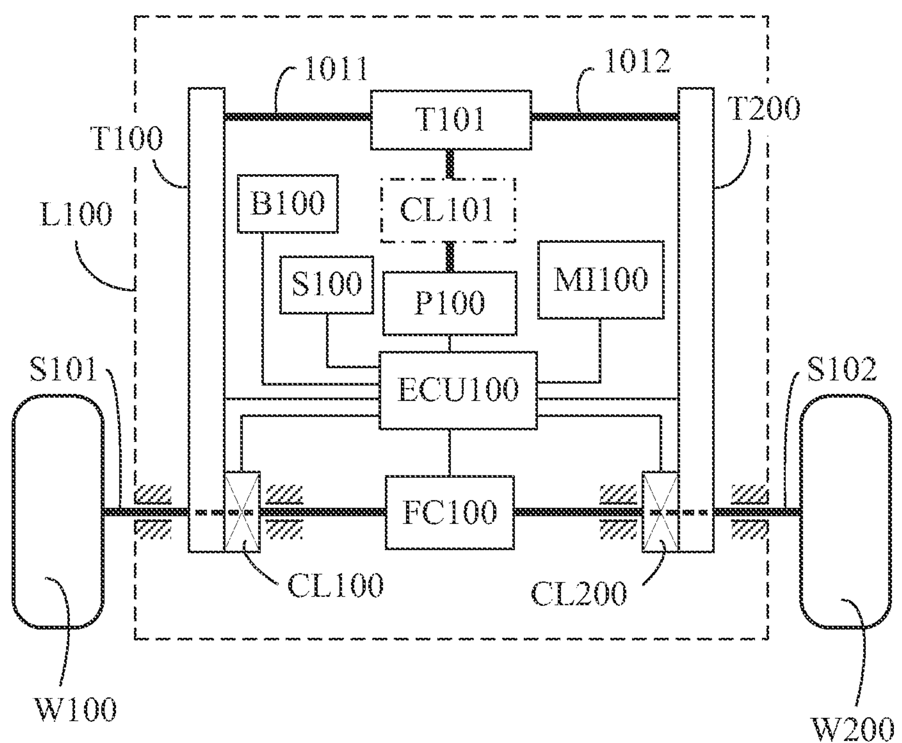
FIG. 6 is a schematic view illustrating a direction changing signal sensor (S100) being provided for sending a signal to a control unit (ECU100) for controlling the relative speed ratio switching between the output end transmission device (T100) and the output end transmission device (T200), according to one embodiment of the present invention.

According to the differential drive system having individual clutch control and mutual flexibility transmission, a direction changing signal sensor (S100) can be further installed, so when changing directions, the signal of the direction changing signal sensor (S100) can be sent to the control unit (ECU100) for controlling the relative speed ratio switching of the output end transmission device (T100) and the output end transmission device (T200), thereby enhancing the performance of the drive for changing direction;

FIG. 6 is a schematic view illustrating a direction changing signal sensor (S100) being provided for sending a signal to a control unit (ECU100) for controlling the relative speed ratio switching between the output end transmission device (T100) and the output end transmission device (T200), according to one embodiment of the present invention;

As shown in FIG. 6, the common load body (L100) is installed with a first transmission device (T101) driven by the rotary kinetic power of a rotary kinetic power source (P100), an output end transmission device (T100) is installed between an output shaft of first transmission device (1011) of the first transmission device (T101) and a left side wheel set (W100) of the loading end, and an output end clutch device (CL100) is installed at the input end of a left side wheel shaft (S101) combined with the wheel set (W100), and an output end transmission device (T200) is installed between an output shaft of first transmission device (1012) and a right side wheel set (W200), and an output end clutch device (CL200) is installed at the input end of a right side wheel shaft (S102) combined with the wheel set (W200), and dual end shafts of a flexibility transmission device (FC100) are respectively connected to the left side wheel shaft (S101) and the right side wheel shaft (S102), which mainly consists of:

rotary kinetic power source (P100): constituted by a power source outputting kinetic power through rotation, e.g. an internal combustion engine, external combustion engine, spring power source, hydraulic power source, pressure power source, flywheel power source or manual force, or animal force, wind power source, and/or composed of a AC or DC, brush or brushless, synchronous or non-synchronous, internal rotating or external rotating type rotary motor installed with relative control devices and electrically driven by power supply and/or storage device; the output end thereof includes outputting directly or outputting through a clutch device;

input end clutch device (CL101): installed between the output end of the rotary kinetic power source (P100) and the input end of the first transmission device (T101), capable of controlling the rotary kinetic power source (P100) to control the transmission or termination of the rotary kinetic power to the first transmission device (T101); the input end clutch device (CL101) includes being controlled by manual force or centrifugal force, or being controlled through the external operation interface (MI100), and formed as a clutch device or structure driven by electric force and/or magnetic force and/or mechanical force and/or pressure and/or hydraulic force for performing transmission engaging or releasing, and having a rotary input end and a rotary output end; the input end clutch device (CL101) can be optionally installed according to actual needs;

first transmission device (T101): constituted by a transmission device having fixed speed ratio or variable speed ratio or continuous variable speed and consisted of mechanical gear sets, or chain sets or pulley sets or linkage rod sets; installed between the rotary kinetic power source (P100) and the input ends of the output end transmission device (T100) and the output end transmission device (T200), including a single side output shaft for driving all wheel sets, or an output shaft of first transmission device (1011) and an output shaft of first transmission device (1012) having output shafts at two sides, so that the wheel sets installed at two sides of the common load body (L100) can be respectively driven through the output end transmission device (T100) and the output end transmission device (T200);

external operation interface (MI100): related to a linear analog type, or digital type, or hybrid type external control device, constituted by a operation mechanisms and/or electromechanical devices, and/or solid state electric circuits which are controlled by manual force, mechanical force or electric power, provided for controlling the operation state of the rotary kinetic power source (P100), and/or controlling the operation of the flexibility transmission device (FC100) and/or the output end transmission device (T100), the output end transmission device (T200), and/or the output end clutch device (CL100), the output end clutch device (CL200) and the input end clutch device (CL101);

control unit (ECU100): constituted by electromechanical devices and/or electric circuit components and/or power semiconductors and/or microprocessors and software, for being connected to the electric power source (B100) and controlled by the external operation interface (MI100) or controlled by the direction changing signal sensor (S100) or operated through the signal of controlling system operation state, for controlling the operation state of the rotary kinetic power source (P100), and/or controlling the operation speed ratios of the multi-shift variable device (T100) and the multi-shift variable device (T200);

direction changing signal sensor (S100): defined as one or more than one physical sensors, for detecting signals relative to direction changing including one or more than one of following signals: a signal of direction changing degree from the steering machine, a signal of inclined angle of vehicle body, a signal of vehicle idling, a signal of upward/downward slope, a signal of acceleration or deceleration, and together with the signal of the external operation interface (MI100) to be transmitted to the control unit (ECU100);

flexibility transmission device (FC100): constituted by a limited slip differential or a dual shaft connecting device having slip damp coupling torque, including a flexibility transmission device having dual shaft structure and formed through fluid viscous effect, hydrodynamic damp effect, mechanical friction effect, electromagnetic vortex effect or power generation reverse torque effect; wherein two rotating ends thereof are respectively connected to the left side wheel shaft (S101) combined with the wheel set (W100) at the left side of the loading end, and the right side wheel shaft (S102) combined with the wheel set (W200) at the right side; during the driving operation, because the unstable operation caused by the individual load varying at the left or the right sides of the loading end, the slip damp coupling torque of the flexibility transmission device (FC100) installed between the wheel sets at the right and the left sides can perform mutual kinetic power transmission;

output end transmission device (T100), (T200): the input end of the output end transmission device (T100) is driven by the rotary kinetic power from the output shaft of first transmission device (1011), and the output end thereof is served to drive the left side wheel set (W100) of the loading end; the input end of the output end transmission device (T200) is driven by the rotary kinetic power from the output shaft of first transmission device (1012), and the output end thereof is served to drive the right side wheel set (W200); the output end transmission device (T100) and the output end transmission device (T200) are consisted of mechanical gear sets, or chain sets or pulley sets or linkage rod sets, and composed of a transmission device having fixed speed ratio for acceleration or deceleration or changing direction, or a manually-operated or automatic or semi-automatic speed ratio varying or belt type continuous variable transmission, or a hydraulic torque converter; the output end transmission devices (T100), (T200) can be optionally installed according to actual needs;

output end clutch device (CL100), (CL200): the output end clutch device (CL100) is installed at the input end of the left side wheel shaft (S101) connected with the wheel set (W100) for controlling the rotary kinetic power outputted to the wheel set (W100); the output end clutch device (CL200) is installed at the input end of the right side wheel shaft (S102) connected with the wheel set (W200), for controlling the rotary kinetic power outputted to the wheel set (W200); the output end clutch device (CL100) and the output end clutch device (CL200) include being controlled by manual force or centrifugal force, or controlled by the external operation interface (MI100) and the control unit (ECU100); or a clutch device or structure having function of performing transmission engaging or releasing while being driven by electric force and/or magnetic force and/or mechanical force and/or air pressure and/or hydraulic force, and has a rotary input end and a rotary output end; the output end clutch device can further include a function of being driven by electric force and/or magnetic force and/or mechanical force and/or air pressure and/or hydraulic force for controlling the coupling torque between engaging and releasing, e.g. an electromagnetic wet type multi-plate clutch device controlling coupling torque through exciting current, or a wet type multi-plate clutch device driven by mechanical force and/or pressure and/or hydraulic force;

The structure of the output end clutch device (CL100), (CL200) includes:

(1) a clutch device or structure driven by the electric force and/or magnetic force and/or mechanical force and/or air pressure and/or hydraulic force for performing transmission engaging or releasing;

(2) driven by the electric force and/or magnetic force and/or mechanical force and/or air pressure and/or hydraulic force for linearly controlling the continuous coupling torque between transmission engaging and releasing;

(3) driven by the electric force and/or magnetic force and/or mechanical force and/or air pressure and/or hydraulic force for performing transmission engaging or releasing, and having torque limited coupling function which is smaller than the engaging torque, after being released;

(4) driven by the electric force and/or magnetic force and/or mechanical force and/or air pressure and/or hydraulic force for performing transmission engaging or releasing, and having a linear damp function which is smaller than the engaging torque and is increased while the rotation differential is increased, after being released;

(5) driven by the electric force and/or magnetic force and/or mechanical force and/or air pressure and/or hydraulic force for performing transmission engaging or releasing, and having a linear damp function which is smaller than the engaging torque and is reduced while the rotation differential is increased, after being released;

(6) (1) to (5) including a radial clutch device;

(7) (1) to (5) including an axial clutch device;

common load body (L100) can be installed with one or more than one non-powered wheels according to actual needs;

By operating the mentioned devices, when the common load body (L100) is driven by the rotary kinetic power source (P100) to operate, and differential speed operation for turning direction is performed at the wheel set (W100) at the left side and the wheel set (W200) at the right side of the loading end, through releasing the output end clutch device between the inner wheel set and the first transmission device (T101), the outer wheel set having high rotational speed performs the flexibility transmission with differential rotation to the inner wheel set having low rotational speed through the flexibility transmission device (FC100), so that the rotational speed of the inner wheel set is lower than that of the outer wheel set but still equipped with the driving power.

The disclosed FIG. 1 to FIG. 4 and FIG. 5 are examples of the differential drive system having individual clutch control and mutual flexibility transmission, when being desired to adopt more loading end wheel sets, the same means disclosed above can be applied.

The drive system disclosed from FIG. 1 to FIG. 6 can be applied in a vehicle or an industry-used, agriculture-used or specially-designed carrier with front wheel drive, or rear wheel drive, or four wheel drive, or multiple wheel drive or driven by belts installed at two sides.

According to the differential drive system having individual clutch control and mutual flexibility transmission, an output end transmission device composed of a stepped or continuous variable transmission having fixed speed ratio for acceleration or deceleration or changing direction can be further installed between the output end of the first transmission device (T101) and the individual loading end wheel set; the mentioned output end transmission device is composed of mechanical gear sets, or chain sets, pulley sets or linkage rod sets, and structured as a transmission device having fixed speed ratio for acceleration or deceleration or changing direction, or a manually-operated or automatic or semi-automatic speed ratio or belt type continuous variable transmission, or a hydraulic type torque converter.

According to the differential drive system having individual clutch control and mutual flexibility transmission, the location where the output end clutch device being individually installed between the output end of the first transmission device (T101) to the individual transmission wheel system of individual loading end wheel set includes one or more than one of followings, including:

(1) installed between the output end of the first transmission device (T101) and the input end of the individual output end transmission device;
(2) installed at the input end of the output end transmission device;
(3) installed at the output end of the output end transmission device;
(4) installed in series between the internal power transmission components of the individual output end transmission device;
(5) installed at the input end of the loading end wheel set;

The mentioned output end clutch device include being controlled by manual force or centrifugal force, or controlled through the external operation interface, and driven by the electric force and/or magnetic force and/or mechanical force and/or air pressure and/or hydraulic force for performing transmission engaging or releasing, and has a rotary input end and a rotary output end.

According to the differential drive system having individual clutch control and mutual flexibility transmission, a flexibility transmission device composed of the limited slip differential or the dual shaft connecting device having slip coupling torque can be further installed at the opposite locations horizontally and coaxially at two sides along the driving direction of the common load body (L100) and between the same transmission operation sets; when the differential operation is performed between the wheel shaft and wheel set at the left side and the wheel shaft and wheel set at the right side combined to the dual shafts of the flexibility transmission device, e.g. the differential operation performed by the flexibility transmission device while the common load body (L100) is making a turn, through releasing the output end clutch device between the inner wheel set and the first transmission device (T101), the outer wheel set having high rotational speed performs the flexibility transmission with rotation differential to the inner wheel set having low rotational speed through the flexibility transmission device, so that the rotational speed of the inner wheel set is lower than that of the outer wheel set but still has the driving power; the flexibility transmission device includes the coupling torque dual shaft connecting device composed of the coupling device have slip damp, e.g. a flexibility transmission device formed with a dual shaft structure through fluid viscous effect, hydrodynamic damp effect, mechanical friction effect, electromagnetic vortex effect or power generation reverse torque effect, two rotating ends are respectively combined at: one or more than one of opposite locations horizontally and coaxially defined on the following transmission operation sets, including:

(1) installed between the wheel shaft connecting the wheel set at the left side and the wheel set at the right side of the common load body (L100);
(2) installed between the opposite input ends of the output end transmission devices at the left and the right sides of the common load body (L100);
(3) installed between the opposite output ends of the output end clutch devices at the left and the right sides of the common load body (L100);
(4) installed between the transmission components having the same rotational speed while being in the normal straight running state in the transmission wheel system of the output end transmission devices at the left and the right sides of the common load body (L100).

According to the differential drive system having individual clutch control and mutual flexibility transmission, the limited slip differential or the flexibility transmission device composed of the dual shaft connecting devices having slip coupling torque installed at the opposite locations horizontally and coaxially defined at two sides along the driving direction of the common load body (L100) and between the installed wheel sets and the drive operation sets can be all or partially installed.

The invention claimed is:

1. A differential drive system, comprising:

a rotary kinetic power source (P100);

a first output end transmission device (T100) and a second output end transmission device (T200);

a left side wheel set (W100) combined with a left side wheel shaft (S101) on a first side of a common load body (L100); and a right side wheel set (W200) combined with a right side wheel shaft (S102) on a second side of the common load body (L100), wherein the first and second output end transmission devices (T100,T200) are directly or indirectly coupled to the rotary kinetic power source (P100) and to the left and right side wheel shafts (S101,S102) to form respective left and right side power transmission couplings between the rotary kinetic power source (P100) and the left and right side wheel sets (W100,W200), and wherein the differential drive system further comprises:

a dual-shaft flexibility transmission device (FC100) having a slip coupling torque between left side and right side output ends, the left side and right side output ends of the dual-shaft flexibility transmission device (FC100) being respectively coupled to at least one of the following: (a)

the left side wheel shaft (S101) and the right side wheel shaft (S102); (b) an input end of the first output end transmission device (T100) and an input end of the second output end transmission device (T200); and (c) an internal structure in the first output end transmission device (T100) and an internal structure in the second output end transmission device (T200);

a first individually-controlled output end clutch device (CL100) for engaging and releasing the power transmission coupling between the rotary kinetic power source (P100) and the left side wheel set (W100);

a second individually-controlled output end clutch device (CL200) for engaging and releasing the power transmission coupling between the rotary kinetic power source (P100) and the right side wheel set (W200), wherein during turning of the common load body (L100), one of said first and second individually-controlled output end clutch devices (CL100 or CL200) is operated to selectively release a corresponding left or right side power transmission coupling between said rotary kinetic power source (P100) and one of said left side and right side wheel sets (W100,W200), whereby an inner one of the wheel sets (W100,W200) during the turn is enabled to rotate at a speed lower than an outer one of the wheel sets (W100,W200) while maintaining a torque-limited power connection to the rotary kinetic power source (P100) through said dual-shaft flexibility transmission device (FC100), and wherein:

the dual-shaft flexibility transmission device (FC100) is installed between the left side wheel shaft (S101) and the right side wheel shaft (S102);

the first individually-controlled output end clutch device (CL100) is installed between the left side input shaft (S101) and the first output end transmission device (T100); and the second individually-controlled output end clutch device (CL200) is installed between the right side input shaft (S102) and the second output end transmission device (T200).

2. A differential drive system as claimed in claim 1, wherein said first individually-controlled clutch device (CL100) and said second individually-controlled clutch device (CL200) are centrifugal or manually-controlled clutch devices.

3. A differential drive system as claimed in claim 1, further comprising an external operation interface (MI100) for controlling said first individually-controlled output end clutch device (CL100) and said second individually-controlled output end clutch device (CL200).

4. A differential drive system as claimed in claim 3, wherein said external operation interface (MI100) further controls at least one of said rotary kinetic power source (P100), said flexibility transmission device (FC100), said first output end transmission device (T100), and said second output end transmission device (T200).

5. A differential drive system as claimed in claim 1, wherein said first individually-controlled clutch device (CL100) and said second individually-controlled clutch device (CL200) are each driven by at least one of an electric force, magnetic force, mechanical force, air pressure force, and hydraulic force for controlling a coupling torque.

6. A differential drive system as claimed in claim 5, wherein the first individually-controlled clutch device (CL100) and the second individually-controlled clutch device (CL200) are wet type multi-plate clutch devices controlled by one of an exciting current, a mechanical force, pneumatic pressure, and a hydraulic force.

7. A differential drive system as claimed in claim 5, wherein said first individually-controlled clutch device (CL100) and said second individually-controlled clutch device (CL200) each includes at least one of the following radial or axial clutch devices:

(a) a clutch device driven by at least one of said forces to perform transmission engaging and releasing;

(b) a clutch device driven by at least one of said forces for linearly controlling a continuous coupling torque between engaging and releasing;

(c) a clutch device driven by at least one of said forces to perform transmission engaging and releasing, and having a torque-limited coupling function which is smaller than an engaging torque after being released;

(d) a clutch device driven by at least one of said forces to perform transmission engaging and releasing, and having a linear damping function that is smaller than the engaging torque and that increases when the rotation differential is increased after release of the clutch device;

(e) a clutch device driven by at least one of said forces to perform transmission engaging and releasing, and having a linear damping function that is smaller than the engaging torque and that decreases when the rotation differential is increased after release of the clutch device.

8. A differential drive system as claimed in claim 1, wherein the dual-shaft flexibility transmission device (FC100) is a limited slip differential or coupling device that provides a slip damping coupling torque through one of fluid viscosity damping effect, hydrodynamic damping, mechanical friction, electromagnetic damping, and power generation reverse torque.

9. A differential drive system as claimed in claim 1, wherein the first and second output end transmission devices (T100,T200) include at least one of a mechanical gear set, chain set, pulley set, linkage rod set, a continuously variable transmission, and a hydraulic torque converter.

10. A differential drive system as claimed in claim 1, further comprising:

an input end clutch device (CL101); and a first transmission device (T101);

wherein the input end clutch device (CL 101) is installed between the rotary kinetic power source (P100) and the input end transmission device (T101), and wherein the input end transmission device (T101) transmits power from the rotary kinetic power source (P100) to the first output end transmission device (T100) and the second output end transmission device (T200).

11. A differential drive system as claimed in claim 1, wherein the rotary kinetic power source (P100) is one of an internal combustion engine, an external combustion engine, a spring power source, a hydraulic power source, a pneumatic pressure power source, a flywheel power source, a manual or animal power source, a wind power source, and an electric motor.

12. A differential drive system as claimed in claim 1, further comprising an electronic control unit (ECU100), a power source (B100) for supplying electrical power to the electronic control unit (ECU100), and at least one of an external operation interface (MI100) and a sensor (S100) for supplying direction changing signals to the electronic control unit (ECU100), operation of the first and second individually controlled clutch devices (CL100,CL200) being controlled in response to said direction changing signals.

13. A differential drive system as claimed in claim 1, wherein said common load body (L100) is a body of a vehicle or carrier with one of a font wheel drive, rear wheel drive, four wheel drive, multiple wheel drive, and drive including belts installed at two sides of the vehicle or carrier.

14. A differential drive system, comprising:
a rotary kinetic power source (P100);
a first output end transmission device (T100) and a second output end transmission device (T200);
a left side wheel set (W100) combined with a left side wheel shaft (S101) on a first side of a common load body (L100); and
a right side wheel set (W200) combined with a right side wheel shaft (S102) on a second side of the common load body (L100),
wherein the first and second output end transmission devices (T100,T200) are directly or indirectly coupled to the rotary kinetic power source (P100) and to the left and right side wheel shafts (S101,S102) to form respective left and right side power transmission couplings between the rotary kinetic power source (P100) and the left and right side wheel sets (W100,W200), and
wherein the differential drive system further comprises:
a dual-shaft flexibility transmission device (FC100) having a slip coupling torque between left side and right side output ends, the left side and right side output ends of the dual-shaft flexibility transmission device (FC100) being respectively coupled to at least one of the following: (a) the left side wheel shaft (S101) and the right side wheel shaft (S102); (b) an input end of the first output end transmission device (T100) and an input end of the second output end transmission device (T200); and (c) an internal structure in the first output end transmission device (T100) and an internal structure in the second output end transmission device (T200);
a first individually-controlled output end clutch device (CL100) for engaging and releasing the power transmission coupling between the rotary kinetic power source (P100) and the left side wheel set (W100);
a second individually-controlled output end clutch device (CL200) for engaging and releasing the power transmission coupling between the rotary kinetic power source (P100) and the right side wheel set (W200); and
an input end transmission (T101), and
wherein:
the dual-shaft flexibility transmission device (FC100) is installed between the left side wheel shaft (S101) and the right side wheel shaft (S102);
the first individually-controlled output end clutch device (CL100) is installed between the input end transmission (T101) and the first output end transmission device (T100); and
the second individually-controlled output end clutch device (CL200) is installed between the input end transmission (T101) and the second output end transmission device (T200).

15. A differential drive system as claimed in claim 14, wherein said first and second individually-controlled output end clutch devices (CL100,CL200) are respectively installed between left and right output shafts (1011,1012) of the input end transmission (T101) and corresponding said first and second output end transmission devices (T100,T200).

16. A differential drive system comprising;
a rotary kinetic power source (P100);
a first output end transmission device (T100) and a second output end transmission device (1200);
a left side wheel set (W100) combined with a left side wheel shaft (S101) on a first side of a common load body (L100); and
a right side wheel set (W200) combined with a right side wheel shaft (S102) on a second side of the common load body (L100),
wherein the first and second output end transmission devices (T100,T200) are directly or indirectly coupled to the rotary kinetic power source (P100) and to the left and right side wheel shafts (S101,S102) to form respective left and right side power transmission couplings between the rotary kinetic power source (P100) and the left and right side wheel sets (W100,W200), and
wherein the differential drive system further comprises:
a dual-shaft flexibility transmission device (FC100) having a slip coupling torque between left side and right side output ends, the left side and right side output ends of the dual-shaft flexibility transmission device (FC100) being respectively coupled to at least one of the following: (a) the left side wheel shaft (S101) and the right side wheel shaft (S102); (b) an input end of the first output end transmission device (T100) and an input end of the second output end transmission device (T200); and (c) an internal structure in the first output end transmission device (T100) and an internal structure in the second output end transmission device (T200);
a first individually-controlled output end clutch device (CL100) for engaging and releasing the power transmission coupling between the rotary kinetic power source (P100) and the left side wheel set (W100);
a second individually-controlled output end clutch device (CL200) for engaging and releasing the power transmission coupling between the rotary kinetic power source (P100) and the right side wheel set (W200);
a third output end transmission device (T300) and a fourth output end transmission device (T400);
a second left side wheel set (W300) combined with a second left side wheel shaft (S103) on the first side of a common load body (L100); and
a second right side wheel set (W400) combined with a second right side wheel shaft (S104) on the second side of the common load body (L100),
wherein the third and fourth output end transmission devices (T300,T400) are directly or indirectly coupled to the rotary kinetic power source (P100) and to the second left and right side wheel shafts (S103,S104) to form respective second left side and right side power transmission couplings between the rotary kinetic power source (P100) and the second left and right side wheel sets (W300,W400), and
wherein the differential drive system further comprises:
a second dual-shaft flexibility transmission device (FC200) having a slip coupling torque between left side and right side outputs, the left side and right side outputs of the second dual-shaft flexibility transmission device (FC200) being respectively coupled to the second left side wheel shaft (S103) and the second right side wheel shaft (S104);
a third individually-controlled output end clutch device (CL300) for engaging and releasing the second left side power transmission coupling between the rotary kinetic power source (P100) and the second left side wheel set (W300);
a fourth individually-controlled output end clutch device (CL400) for engaging and releasing the second right side power transmission coupling between the rotary kinetic power source (P100) and the second right side wheel set (W400), wherein during turning of the common load body (L100), one of said third and fourth individually-controlled output end clutch devices (CL300 or CL400) is operated to selectively release the corresponding second left or right side power transmission coupling between said rotary kinetic power source (P100) and one of said second left side and right side wheel sets (W300,W400), whereby an inner one of the second left side and right side wheel sets (W300,W400) during the turn is enabled to rotate at a speed lower than an outer one of the second left side and right side wheel sets (W300,W400) while maintaining a torque-limited power connection to the rotary kinetic power source (P100) through said second dual-shaft flexibility transmission device (FC200).

17. A differential drive system as claimed in claim 16, further comprising:

a fifth output end transmission device (T500) and a sixth output end transmission device (T600);

a third left side wheel set (W500) combined with a third left side wheel shaft (S105) on the first side of a common load body (L100); and a third right side wheel set (W600) combined with a third right side wheel shaft (S106) on the second side of the common load body (L100), wherein the fifth and sixth output end transmission devices (T500,T600) are directly or indirectly coupled to the rotary kinetic power source (P100) and to the third left and right side wheel shafts (S105,S106) to form respective third left side and right side power transmission couplings between the rotary kinetic power source (P100) and the third left and right side wheel sets (W500, W600), and wherein the differential drive system further comprises:

a third dual-shaft flexibility transmission device (FC300) having a slip coupling torque between left and right output ends, the left and right output ends of the third dual-shaft flexibility transmission device (FC300) being respectively coupled to the third left side wheel shaft (S105) and the third right side wheel shaft (S106);

a fifth individually-controlled output end clutch device (CL500) for engaging and releasing the third left side power transmission coupling between the rotary kinetic power source (P100) and the third left side wheel set (W500);

a sixth individually-controlled output end clutch device (CL600) for engaging and releasing the third right side power transmission coupling between the rotary kinetic power source (P100) and the third right side wheel set (W600), wherein during turning of the common load body (L100), one of said fifth and sixth individually-controlled output end clutch devices (CL500 or CL600) is operated to selectively release the corresponding third left or right side power transmission coupling between said rotary kinetic power source (P100) and one of said third left side and right side wheel sets (W500,W600), whereby an inner one of the third left side and right side wheel sets (W500,W600) during the turn is enabled to rotate at a speed lower than an outer one of the third left side and right side wheel sets (W500,W600) while maintaining a torque-limited power connection to the rotary kinetic power source (P100) through said third dual-shaft flexibility transmission device (FC300).

* * * * *